(12) United States Patent
Krishnan et al.

(10) Patent No.: US 10,863,138 B2
(45) Date of Patent: Dec. 8, 2020

(54) SINGLE PASS PARALLEL ENCRYPTION METHOD AND APPARATUS

(71) Applicant: Intel Corporation, Santa Clara, CA (US)

(72) Inventors: Vidhya Krishnan, Folsom, CA (US); Balaji Vembu, Folsom, CA (US); Sandeep S. Sodhi, Folsom, CA (US); Priyadarsini Devanand, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 847 days.

(21) Appl. No.: 15/169,262

(22) Filed: May 31, 2016

(65) Prior Publication Data

US 2017/0347065 A1    Nov. 30, 2017

(51) Int. Cl.
| | | |
|---|---|---|
| *H04N 7/167* | (2011.01) | |
| *H04L 9/06* | (2006.01) | |
| *H04N 21/2347* | (2011.01) | |

(52) U.S. Cl.
CPC .......... *H04N 7/1675* (2013.01); *H04L 9/065* (2013.01); *H04N 21/2347* (2013.01); *H04L 2209/125* (2013.01); *H04L 2209/34* (2013.01); *H04L 2209/60* (2013.01)

(58) Field of Classification Search
USPC ........ 380/239, 255, 264, 276; 726/2, 21, 36; 713/150, 163, 181
See application file for complete search history.

(56) References Cited

U.S. PATENT DOCUMENTS

| | | | | |
|---|---|---|---|---|
| 7,818,563 B1 * | 10/2010 | Dwork | .................... | H04L 63/06 713/151 |
| 8,850,200 B1 * | 9/2014 | Horgan | ............... | H04L 63/0428 380/277 |
| 8,886,926 B2 * | 11/2014 | Paris | .................... | H04L 9/0637 713/150 |

(Continued)

FOREIGN PATENT DOCUMENTS

CN          104284208 A  *  1/2015

*Primary Examiner* — Sharif E Ullah
(74) *Attorney, Agent, or Firm* — Schwabe, Williamson & Wyatt, P.C.

(57) ABSTRACT

Apparatuses, methods and storage medium associated with single pass parallel encryption are disclosed herein. In embodiments, an apparatus for computing may comprise an encryption engine to encrypt a video stream. The encryption engine may comprise a plurality of encryption pipelines to respectively encrypt a plurality of video sub-streams partitioned from the video stream in parallel in a single pass as the video sub-streams are being generated. The plurality of encryption pipelines may use a corresponding plurality of multi-part encryption counters to encrypt the corresponding video sub-streams as the video sub-streams are being generated. Each of the multi-part encryption counters used by one of the encryption pipelines may comprise a sub-portion that remains constant while encoding the corresponding video sub-stream, but the sub-key is unique for the one encryption pipeline, and differs from corresponding sub-portions of the multi-part encryption counters used by the other encryption pipelines. Other embodiments may be disclosed or claimed.

25 Claims, 5 Drawing Sheets

(56) References Cited

U.S. PATENT DOCUMENTS

| | | | |
|---|---|---|---|
| 10,237,066 B1* | 3/2019 | Langhammer | H04L 9/0637 |
| 2002/0048364 A1* | 4/2002 | Gligor | H04L 9/0637 |
| | | | 380/37 |
| 2007/0139421 A1* | 6/2007 | Chen | G06T 1/20 |
| | | | 345/501 |
| 2009/0119355 A1* | 5/2009 | Nakagoe | G11B 20/00086 |
| | | | 708/200 |
| 2009/0119510 A1* | 5/2009 | Long | H04L 9/0631 |
| | | | 713/171 |
| 2010/0150350 A1* | 6/2010 | Reidenbach | H04L 9/0631 |
| | | | 380/277 |
| 2017/0063532 A1* | 3/2017 | Bhattacharyya | G06F 21/76 |
| 2017/0347065 A1* | 11/2017 | Krishnan | H04L 9/065 |
| 2020/0159657 A1* | 5/2020 | Kida | G06F 9/4806 |
| 2020/0167487 A1* | 5/2020 | Kida | H04L 9/14 |

* cited by examiner

SINGLE PASS PARALLEL ENCRYPTION METHOD AND APPARATUS

TECHNICAL FIELD

The present disclosure relates to the fields of computing. More specifically, the present disclosure is related to single pass parallel encryption.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Many applications require encryption to protect an output bitstream. For example, for wireless display, there is a requirement to support High-Definition Digital Content Protection (HDCP) of the output bitstream. Current generation of HDCP products use a single pass scheme to encrypt the content after encoding. Future graphics platforms are expected to support split single frame encode for High Efficiency Video Coding (HEVC), also known as H.265, across multiple hardware pipes to achieve higher encoding frame rate/bitrate. However, with parallel encoding, there would be no way to predict the actual encoded bitstream size before the complete operation is done. This would require the encoding and encryption be performed with two passes, first pass for encoding, then on completion of encoding, a second pass for encryption.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with single pass parallel encryption are disclosed herein. In embodiments, an apparatus for computing may comprise an encryption engine to encrypt a video stream. The encryption engine may comprise a plurality of encryption pipelines to respectively encrypt a plurality of video sub-streams partitioned from the video stream in parallel in a single pass as the video sub-streams are generated. The plurality of encryption pipelines may use a corresponding plurality of multi-part encryption counters to encrypt the corresponding video sub-streams as the video sub-streams are being generated. Each of the multi-part encryption counters used by one of the encryption pipelines may comprise a sub-portion that remains constant while encoding the corresponding video sub-stream, but the sub-portion is unique for the one encryption pipeline, and differs from corresponding sub-portions of the multi-part encryption counters used by the other encryption pipelines.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
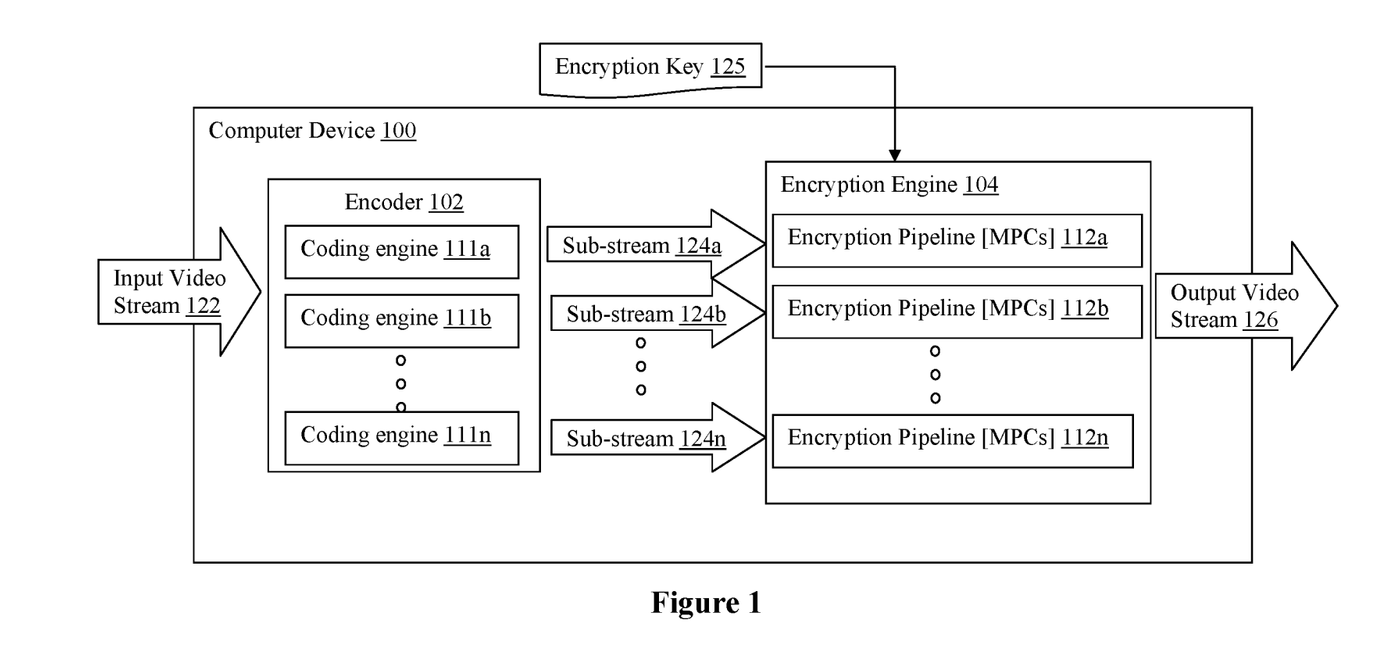
FIG. 1 illustrates a schematic view of the single pass parallel encryption technology of the present disclosure, in accordance with various embodiments.

Referring now to FIG. 1, wherein a schematic view of the single pass parallel encryption technology of the present disclosure, in accordance with various embodiments, is shown. As illustrated, in embodiments, a computer device 100 may include encoder 102 and encryption engine 104. Encoder 102 may be configured to receive an input video stream 122 having a plurality of frames, and encode the frames to reduce the amount of data ultimately has to be streamed. Further, encoder 102 may include a plurality of coding engines 111*a*-111*n*, and configured to support HEVC/H.265, partitioning each frame into a plurality of sub-frames, encoding multiple ones of the sub-frames in parallel to improve the encoding rate, and outputting the parallel encoded sub-frames into a plurality of video sub-streams 124*a*-124*n*. In embodiments, the input video stream 122 may have any YUV/RGB content.

Encryption engine 104 may be configured with a plurality of encryption pipelines 112a-112n to respectively encrypt video sub-streams 124a-124n in parallel, in a single pass, i.e., while video sub-streams 124a-124n are generated, without having to wait for each of video sub-streams 124a-124n to be completely generated. On encryption, encryption pipelines 112a-112n output the encrypted video sub-streams as output video stream 126. To enable encryption in parallel, in a single pass, each encryption pipeline 112a-112n uses encryption key 125 and a plurality of coordinated multi-part encryption counters (MPC) to encode its video sub-stream 124a-124n. Each encryption pipeline 112a-112n may encrypt the corresponding video sub-streams 124a-124n in accordance with Advanced Encryption Standard (AES) using encryption key 125 and the MPC. In embodiments, encryption key 125 may be provided to computing device 100 during an initial configuration of encryption engine 104, or during operation. In still other embodiments, encryption key 125 may be pre-loaded/pre-stored onto computing device 100 at manufacturing time.

Figure 2:
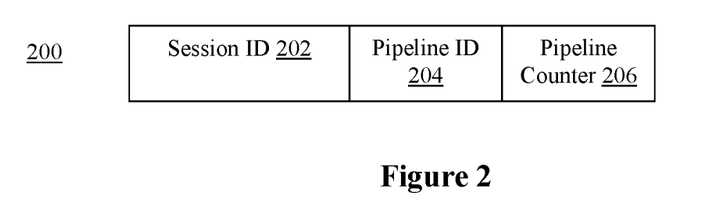
FIG. 2 illustrate a multi-part encryption counter in further detail, in accordance with various embodiments

FIG. 2 illustrate a multi-part encryption counter in further detail, in accordance with various embodiments. As shown, in embodiment, each MPC 200 may include three sub-portions 202-206. The first sub-portion 202 is to form the m most significant bits (MSB) of the MPC 200. The first sub-portion 202 is to remain constant/unchanged while encoding a sub-stream, and is the same for all sub-streams of a video stream. In embodiments, the first sub-portion 202 may correspond to a session identifier. The second sub-portion 204 is to form the next n most significant bits (MSB) of the MPC 200. The second sub-portion 204 is to remain constant/unchanged while encoding a sub-stream, but is unique for an encryption pipeline, and differs across the different pipelines. In embodiments, the second sub-portion 204 may correspond to an encryption pipeline identifier. The third sub-portion 206 is to form the least significant bits (LSB) of the MPC 200. The third sub-portion 206 is to be incremented as a sub-stream is being encoded. In embodiments, the third sub-portion 206 may starts at an initial value, and increments by an increment value after every b bytes of a sub-stream has been encrypted. Thus, with the advantageous employment of the second sub-key 204, the MPC 200 used for various sub-streams 124a-124n by encryption pipelines 112a-112n will be unique, allowing encryption pipelines 112a-112n to encode various sub-streams 124a-124n in parallel, and in a single pass as various sub-streams 124a-124n are generated, without having to wait for the encoding of all sub-streams 124a-124n to be completed, before starting encryption with a second pass. Further, the approach advantageously avoid reusing the MPC, which may reduce security.

In embodiments, each MPC 200 may be 128 bit long. The first sub-portion 202 may be a session identifier that forms the first 64 MSB; the second sub-portion 204 may be an encryption pipeline identifier that forms the next 4 MSB, and the third sub-portion 206 may be a pipeline/sub-stream counter that forms the 60 LSB, that starts at an initial value of 0 and increments by 1 after every 16 bytes of a sub-stream has been encrypted. Accordingly, encryption engine 104 having encryption pipelines 112a-112n may respectively encrypt sub-streams 124a-124n in parallel, in a single pass as various sub-streams 124a-124n are generated, to generate output video stream 126, without having to wait for the encoding of all sub-streams 124a-124n to be completed, before starting encryption with a second pass, in support of HDCP.

Figure 3:
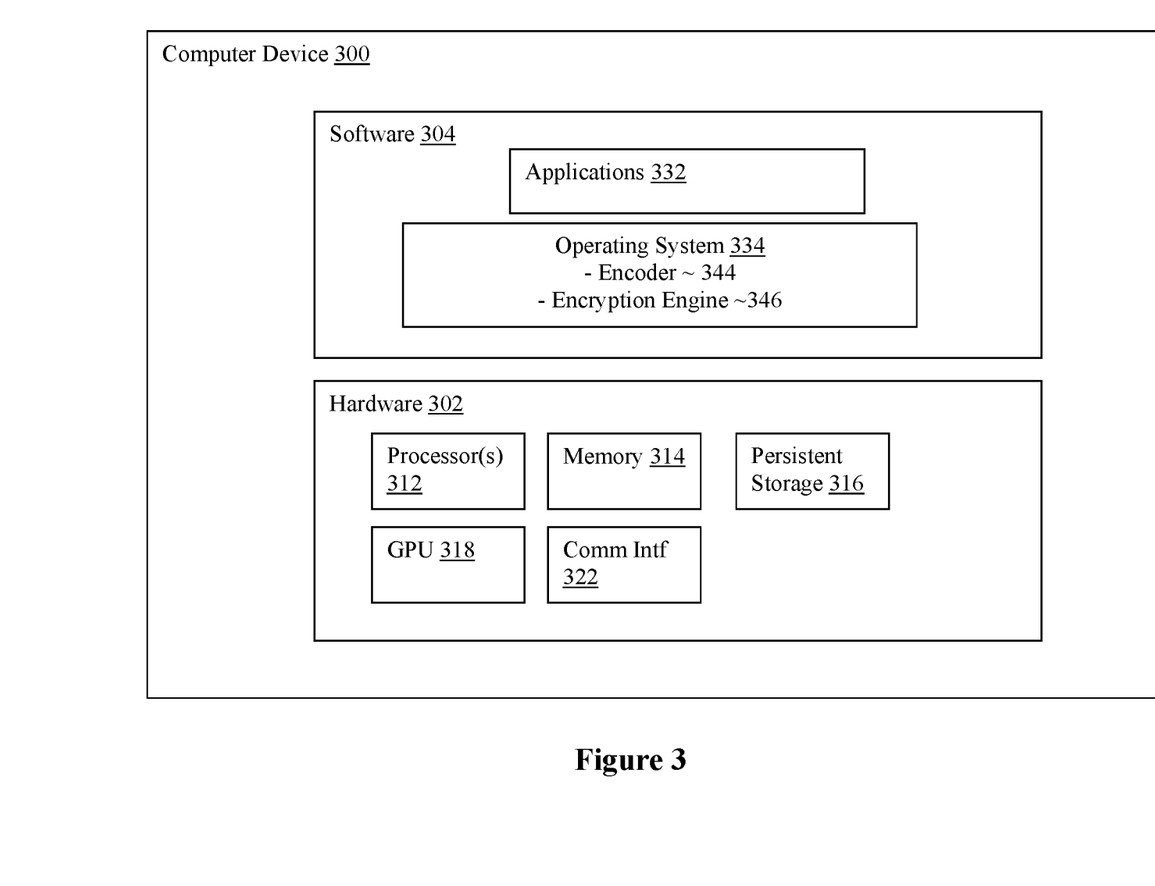
FIGS. 3 and 4 illustrate two example computer devices equipped with the single pass parallel encryption technology of the present disclosure, in accordance with various embodiments.
Figure 4:
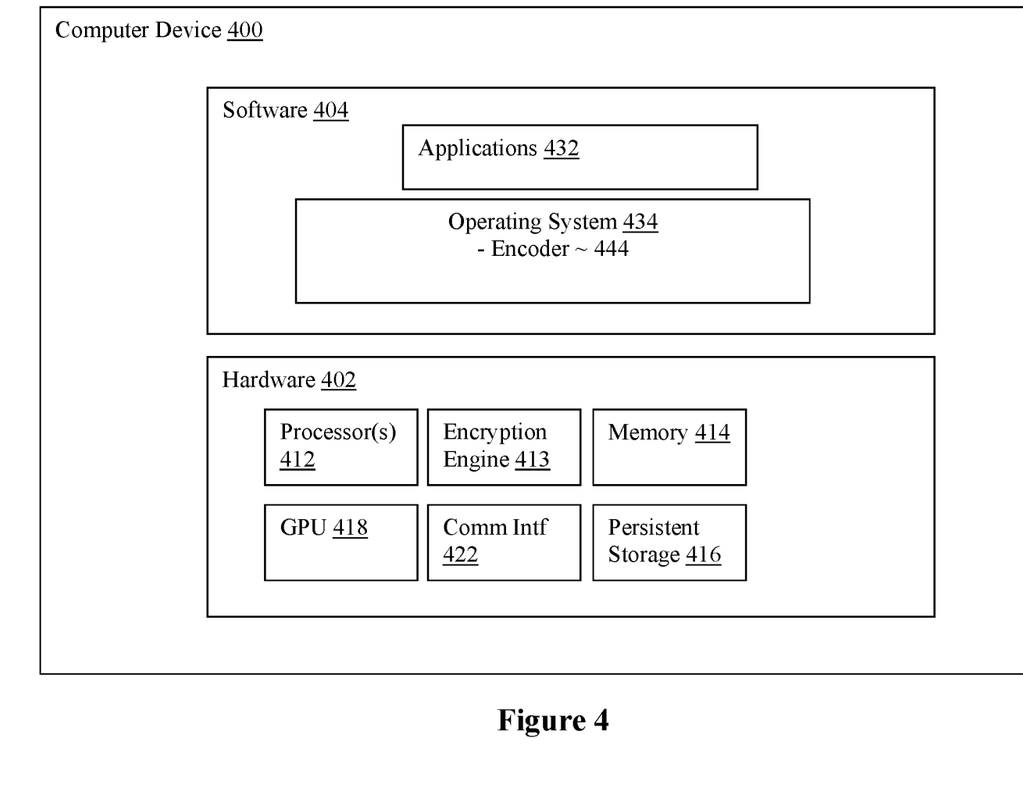

Referring now to FIGS. 3 and 4, wherein two example computer devices equipped with the single pass parallel encryption technology of the present disclosure, in accordance with various embodiments, are shown. As illustrated in FIG. 3, in embodiments, computer device 300 (which may be computer device 100) may include hardware 302 and software 304. Software 304 may include operating system (OS) 334 and application 332. OS 334 may include encoder 344 and encryption engine 346, which may correspond to the earlier described encoder 102 and encryption engine 104. OS 334, except for encoder 344 and encryption engine 346, may be any one of a number of OS known in art. Applications 332 may likewise be any one of a number of known applications, e.g., video streaming applications.

Hardware 302 may include processor(s) 312, memory 314, persistent storage 316, graphics processor (GPU) 318, and communication interface 322. Processor(s) 312 may be any one of a number of processors known in the art, each having one or more processor cores. GPU 318 may likewise be any one of a number of graphics processors known in the art. Processor(s) 312 and GPU 318 may be configured to execute software 304, including applications 332, and OS 334 (including encoder 344 and encryption engine 346). In embodiments, multiple instances of encoder 344 and/or the various encryption pipelines of encryption engine 346 may execute in parallel in different cores of processor(s) 312 and/or GPU 318. In embodiments, the multiple instances of encoder 344 and/or various encryption pipelines of encryption engine 346 may execute in dedicated cores of processor (s) 312 (not shared with other applications and/or OS functions).

Memory 314 may be any known volatile or non-volatile memory in the art, suitable for storing instructions for execution and working data, in particular, instructions and data of applications 332 and OS 334, including encoder 344 and encryption engine 346. Memory 314 may include a hierarchy of cache memory and system memory. Both the cache and system memory may be respectively organized into cache pages and memory pages. Persistent storage 316 may be any known persistent mass storage suitable for providing persistent storage of instructions and data of applications 332 and OS 334, e.g., solid state storage, magnetic or optical disk drives. Communication interface 322 may include any number of wireless communication or networking interfaces known, such as WiFi, 3G/4G, Bluetooth®, Near Field Communication, and so forth. Communication interface 322 may also include wired/wireless display interface, including but are not limited to DisplayPort (DP), Digital Visual Interface (DVI), High-Definition Multimedia Interface (HDMI), and so forth.

As illustrated in FIG. 4, in embodiments, computer device 400 (which may be computer device 100) may be similar to computer device 300, with the exception that encryption engine 413, which is implemented in hardware, as opposed in software. Otherwise, computer device 400 may include hardware 402 and software 404, similar to hardware 302 and software 304. That is software 404 may include operating system (OS) 434 and applications 432, similar to OS 334 and applications 332. OS 434 may include encoder 444, similar to encoder 344; whereas hardware 402 may include processor(s) 412, GPU 418, memory 414, persistent storage 416, and communication interface 422, similar to processor (s) 312, GPU 318, memory 314, persistent storage 316, and communication interface 322. Encryption engine 413, however, in embodiments, may be implemented as with a dedicated ASIC, or with a programmable circuit, such as, a field programmable gate array.

Figure 5:
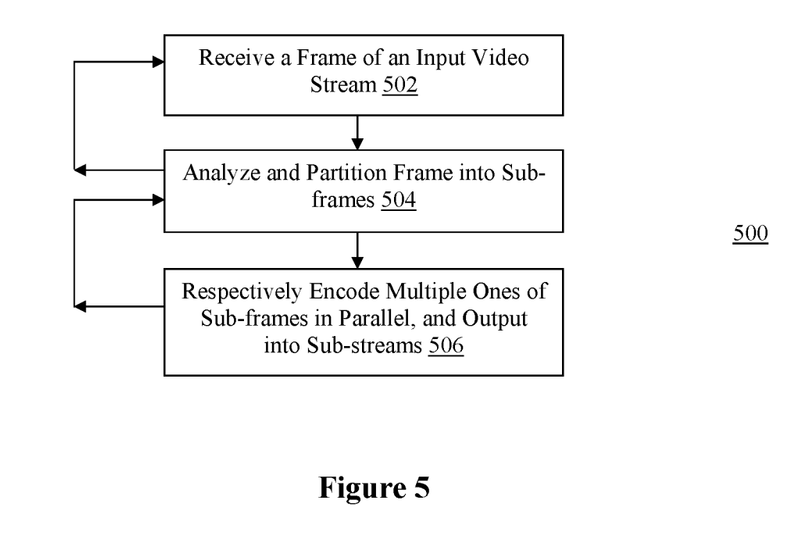
FIG. 5 illustrates example operation flow/algorithmic architecture of the encoder, in accordance to various embodiments.

Referring now to FIG. 5, wherein example operation flow/algorithmic architecture of the encoder, in accordance to various embodiments, is shown. As illustrated, in embodiments, process 500 for encoding a video stream may include operations performed at blocks 502-508. Process 500 may be performed e.g., by encoder 102 having multiple coding engines 111a-111n; in other words, process 500 depicts the algorithmic structure of encoder 102/344/444.

At block 502, a frame of an input video stream may be received.

At block 504, the frame may be analyzed (e.g., for redundancy), optionally modified, and partitioned into sub-frames; on partition, process 500 may proceed to block 506, and at the same time, return to 502 to receive another frame.

At block 506, multiple ones of the sub-frames may be respectively encoded in parallel, and output as separate sub-streams; on encoding the sub-frames, process 500 may return to 504 to receive another frame.

Process 500 may be repeated as many iterations as necessary to encode the various frames of an input video stream into multiple video sub-streams in parallel.

Figure 6:
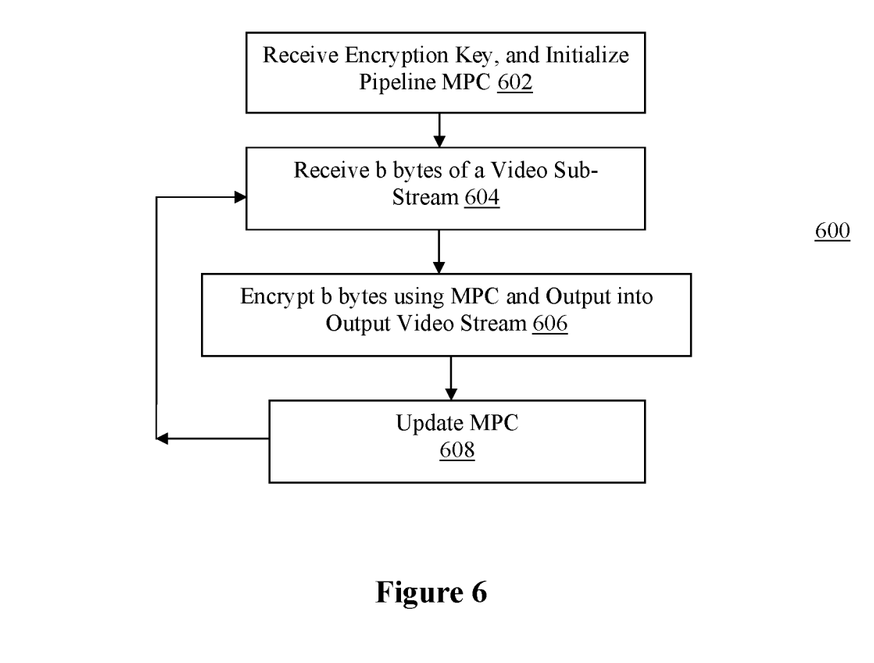
FIG. 6 illustrates example operation flow/algorithmic architecture of an encryption pipeline of the encryption engine, in accordance to various embodiments.

Referring now to FIG. 6, wherein example operation flow/algorithmic architecture of an encryption pipeline of the encryption engine, in accordance to various embodiments, is shown. As illustrated, in embodiments, process 600 for encryption may include operations performed at blocks 602-606. Process 600 may be performed e.g., by any one of encryption pipelines 112a-112n of encryption engine 104, in other words, process 600 depicts the algorithmic structure of each encryption pipelines 112a-112n of encryption engine 104.

At block 602, the encryption key may be received, and a MPC may be initialized for the encryption pipeline. As described earlier, in embodiments, the MPC may be 128 bit long, with the first 64 MSB initialize to a session identifier, the next 4 MSB initialized to an encryption pipeline identifier, and 60 LSB initialized to 0.

At block 604, the next b bytes of a video sub-stream may be received. As described earlier, in embodiments, b may be 16.

At block 606, the b bytes of the video sub-stream may be encrypted using the current MPC. In embodiments, as described earlier, the b bytes of the video sub-stream may be encrypted in accordance with AES.

At block 608, the MPC may be updated in preparation for encryption of the next b bytes. As described earlier, in embodiments where the MPC may be 128 bit long, with the first 64 MSB initialize to a session identifier, the next 4 MSB initialized to an encryption pipeline identifier, and 60 LSB initialized to 0, the 60 LSB may be incremented by 1. On update of the MPC, process 600 may return to block 604 and continue therefrom, as earlier described.

Blocks 604-608 of process 600 may be repeated as many iterations as necessary to encrypt a video sub-stream, in parallel with encryption of other video sub-streams by other encryption pipeline, in a single pass, while the video sub-streams are being generated, without having to wait for all video sub-streams to be generated before commencing the encryption.

Thus, example embodiments described may include:

Example 1 may be an apparatus for computing, comprising: an encryption engine to encrypt a video stream; wherein the encryption engine may comprise a plurality of encryption pipelines to respectively encrypt a plurality of video sub-streams partitioned from the video stream in parallel in a single pass as the video sub-streams are being generated; wherein the plurality of encryption pipelines may use a corresponding plurality of multi-part encryption counters to encrypt the corresponding video sub-streams as the video sub-streams are being generated; and wherein each of the multi-part encryption counters used by one of encryption pipelines may comprise a sub-portion that remains constant while encoding the corresponding video sub-stream, but the sub-portion is unique for the one encryption pipeline, and differs from corresponding sub-portions of the multi-part encryption counters used by the other encryption pipelines.

Example 2 may be example 1, wherein the sub-portions of the multi-part encryption counters used by the encryption pipelines may respectively identify the encryption pipelines.

Example 3 may be example 1, wherein each of the multi-part encryption counters may comprise three sub-portions, of which the unique sub-portion of each encryption pipeline that remains constant while encoding the corresponding video sub-stream, and differs from corresponding sub-portions of the multi-part encryption counters used by the other encryption pipelines, is one of the three sub-portions.

Example 4 may be example 3, wherein each of the multi-part encryption counters may comprise a plurality of bits, and wherein a first of the three sub-portions of each multi-part encryption counter may form the most significant bits of the multi-part encryption counter, and the first sub-portion may remain constant while encoding the video sub-streams, and the first sub-portion may be the same for all multi-part encryption counters used by the all encryption pipelines.

Example 5 may be example 4, wherein the first sub-portion may identify an encryption session.

Example 6 may be example 4, wherein a second of the three sub-portions of each multi-part encryption counter may form the next most significant bits of the multi-part encryption counter, and the second sub-portion may be the unique sub-portion of each encryption pipeline that remains constant while encoding the corresponding video sub-stream, and differs from corresponding sub-portions of the multi-part encryption counters used by the other encryption pipelines.

Example 7 may be example 6, wherein a third of the three sub-portions of each multi-part encryption counter may form the least significant bits of the multi-part encryption counter, and the third sub-portion may increment as the corresponding video sub-stream is encoded.

Example 8 may be example 7, wherein each third sub-portion may start with a value 0, and increment by 1, after n number of bytes of the corresponding video sub-stream are encoded.

Example 9 may be example 8, wherein each multi-part encryption counter may comprise 128 bits, the first sub-portion may form the 64 most significant bits, the second sub-portion may form the next 4 most significant bits, the third sub-portion may form the 60 least significant bits, and n may equal 16.

Example 10 may be any one of examples 1-9, wherein the plurality of video streams may be encoded video sub-streams; and wherein the apparatus may further comprise an encoder, having a plurality of coding engine, to receive frames of the video stream, partition each frame of the video stream into a plurality of sub-frames, encode multiple ones of the plurality of sub-frames of the frames in parallel, and output the parallel encoded sub-frames of the frames as the plurality of video sub-streams.

Example 11 may be example 10, further comprising a processor having a plurality of processor cores; wherein either or both of the encoders and the encryption engine may be operated by the processor.

Example 12 may be a method for computing, comprising: receiving, by a plurality of encryption pipelines of an encryption engine, a plurality of video sub-streams partitioned from a video stream; respectively encrypting, by the plurality of encryption pipelines, the plurality of video sub-streams in parallel in a single pass as the video sub-streams are being generated; wherein encrypting may comprise the plurality of encryption pipelines using a corresponding plurality of multi-part encryption counters to encrypt the corresponding video sub-streams in a single pass as the video sub-streams are being generated; and wherein each of the multi-part encryption counters used by one of the encryption pipelines may comprise a sub-portion that remains constant while encoding the corresponding video sub-stream, but the sub-portion is unique for the encryption pipeline, and differs from corresponding sub-portions of the multi-part encryption portions used by the other encryption pipelines Example 13 may be example 12, wherein the sub-portions of the multi-part encryption counters used by the encryption pipelines may respectively identify the encryption pipelines.

Example 14 may be example 12, wherein each of the multi-part encryption counters may comprise three sub-portions, of which the unique sub-portion of each encryption pipeline that remains constant while encoding the corresponding video sub-stream, and differs from corresponding sub-portions of the multi-part encryption counters used by the other encryption pipelines, may be one of the three sub-portions.

Example 15 may be example 14, wherein each of the multi-part encryption counters may comprise a plurality of bits, and wherein a first of the three sub-portions of each multi-part encryption counter may form the most significant bits of the multi-part encryption counter, and the first sub-portion may remain constant while encoding the video sub-streams, and the first sub-portion may be the same for all multi-part encryption counters used by the all encryption pipelines.

Example 16 may be example 15, wherein the first sub-portion may identify an encryption session.

Example 17 may be example 15, wherein a second of the three sub-portions of each multi-part encryption counter may form the next most significant bits of the multi-part encryption counter, and the second sub-portion may be the unique sub-portion of each encryption pipeline that remains constant while encoding the corresponding video sub-stream, and differs from corresponding sub-portions of the multi-part encryption counters used by the other encryption pipelines.

Example 18 may be example 17, wherein a third of the three sub-portions of each multi-part encryption counter may form the least significant bits of the multi-part encryption counter, and the third sub-portion may increment as the corresponding video sub-stream is encoded.

Example 19 may be example 18, wherein each third sub-portion may start with a value 0, and increments by 1, after n number of bytes of the corresponding video sub-stream may be encoded.

Example 20 may be example 19, wherein each multi-part encryption counter may comprise 128 bits, the first sub-portion may form the 64 most significant bits, the second sub-portion may form the next 4 most significant bits, the third sub-portion may form the 60 least significant bits, and n may equal 16.

Example 21 may be any one of examples 12-20, wherein the plurality of video streams may be encoded video sub-streams; and wherein the method may further comprise receiving, by an encoder having a plurality of coding engines, frames of the video stream, partitioning each frame into a plurality of sub-frames, encoding multiple ones of the plurality of sub-frames of the frames in parallel, and outputting the parallel encoded sub-frames of the frames as the plurality of video sub-streams.

Example 22 may be one or more computer-readable media comprising instructions that cause a computer device, in response to execution of the instructions by a plurality of processor cores of a processor of the computer device, to provide an encryption engine to encrypt a video stream; wherein the encryption engine may comprise a plurality of encryption pipelines to respectively encrypt a plurality of video sub-streams partitioned from the video stream in parallel in a single pass as the video sub-streams are being generated; wherein the plurality of encryption pipelines may use a corresponding plurality of multi-part encryption counters to encrypt the corresponding video sub-streams in a single pass as the video sub-streams are being generated; and wherein each of the multi-part encryption counters used by one of the encryption pipelines may comprise a sub-portion that remains constant while encoding the corresponding video sub-stream, but the sub-portion is unique for the one encryption pipeline, and differs from corresponding sub-portions of the multi-part encryption counters used by the other encryption pipelines.

Example 23 may be example 22, wherein the sub-portions of the multi-part encryption counters used by the encryption pipelines may respectively identify the encryption pipelines.

Example 24 may be example 22, wherein each of the multi-part encryption counters may comprise three sub-portions, of which the unique sub-portion of each encryption pipeline that remains constant while encoding the corresponding video sub-stream, and differs from corresponding sub-portions of the multi-part encryption counters used by the other encryption pipelines, is one of the three sub-portions.

Example 25 may be example 24, wherein each of the multi-part encryption counters may comprise a plurality of bits, and wherein a first of the three sub-portions of each multi-part encryption counter may form the most significant bits of the multi-part encryption counter, and the first sub-portion remains constant while encoding the video sub-streams, and the first sub-portion may be the same for all multi-part encryption counters used by the all encryption pipelines.

Example 26 may be example 25, wherein the first sub-portion may identify an encryption session.

Example 27 may be example 25, wherein a second of the three sub-portions of each multi-part encryption counter may form the next most significant bits of the multi-part encryption counter, and the second sub-portion may be the unique sub-portion of each encryption pipeline that remains constant while encoding the corresponding video sub-stream, and differs from corresponding sub-portions of the multi-part encryption counters used by the other encryption pipelines.

Example 28 may be example 27, wherein a third of the three sub-portions of each multi-part encryption counter may form the least significant bits of the multi-part encryption counter, and the third sub-portion may increment as the corresponding video sub-stream is encoded.

Example 29 may be example 28, wherein each third sub-portion starts with a value 0, and increments by 1, after n number of bytes of the corresponding video sub-stream may be encoded.

Example 30 may be example 29, wherein each multi-part encryption counter may comprise 128 bits, the first sub-portion may form the 64 most significant bits, the second sub-portion may form the next 4 most significant bits, the third sub-portion may form the 60 least significant bits, and n equals 16.

Example 31 may be any one of examples 22-30, wherein the plurality of video streams may be encoded video sub-streams; and wherein the computer device may further comprise an encoder having a plurality of coding engines to receive frames of the video stream, partition each frame into sub-frames, encode multiple ones of the plurality of sub-frames of the frames in parallel, and output the parallel encoded sub-frames of the frames as the plurality of video sub-streams.

Example 32 may be an apparatus for computing, comprising: means, including a plurality of encryption pipelines, for encrypting a plurality of video sub-streams partitioned from a video stream in parallel in a single pass as the video sub-streams are being generated; wherein encrypting may comprise the plurality of encryption pipelines using a corresponding plurality of multi-part encryption counters to encrypt the corresponding video sub-streams in a single pass as the video streams are being generated; and wherein each of the multi-part encryption counters used by one of the encryption pipelines may comprise a sub-portion that remains constant while encoding the corresponding video sub-stream, but the sub-portion is unique for the one encryption pipeline, and differs from corresponding sub-portions of the multi-part encryption counters used by the other encryption pipelines.

Example 33 may be example 32, wherein the sub-portions of the multi-part encryption counters used by the encryption pipelines may respectively identify the encryption pipelines.

Example 34 may be example the unique sub-portion of each encryption pipeline that may remain constant while encoding the corresponding video sub-stream, and differ from corresponding sub-portions of the multi-part encryption counters used by the other encryption pipelines, is one of the three sub-portions.

Example 35 may be example 34, wherein each of the multi-part encryption counters may comprise a plurality of bits, and wherein a first of the three sub-portions of each multi-part encryption counter may form the most significant bits of the multi-part encryption counter, and the first sub-portion may remain constant while encoding the video sub-streams, and the first sub-portion may be the same for all multi-part encryption counters used by the all encryption pipelines.

Example 36 may be example 35, wherein the first sub-portion may identify an encryption session.

Example 37 may be example 35, wherein a second of the three sub-portions of each multi-part encryption counter may form the next most significant bits of the multi-part encryption counter, and the second sub-portion may be the unique sub-portion of each encryption pipeline that remains constant while encoding the corresponding video sub-stream, and differs from corresponding sub-portions of the multi-part encryption counters used by the other encryption pipelines.

Example 38 may be example 37, wherein a third of the three sub-portions of each multi-part encryption counter may form the least significant bits of the multi-part encryption counter, and the third sub-portion may increment as the corresponding video sub-stream is encoded.

Example 39 may be example 38, wherein each third sub-portion may start with a value 0, and increment by 1, after n number of bytes of the corresponding video sub-stream may be encoded.

Example 40 may be example 39, wherein each multi-part encryption counter may comprise 128 bits, the first sub-portion may form the 64 most significant bits, the second sub-portion may form the next 4 most significant bits, the third sub-portion may form the 60 least significant bits, and n equals 16.

Example 41 may be any one of examples 32-40, wherein the plurality of video streams are encoded video sub-streams; and wherein the apparatus may further comprise means, including a plurality coding engines, for receiving frames of the video stream, partitioning each frame into sub-frames, encoding multiple ones of the plurality of sub-frames of the frames in parallel, and outputting the parallel encoded sub-frames of the frames as the plurality of video sub-streams.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for computing, comprising:
an encryption engine to encrypt a video stream;
wherein the encryption engine comprises a plurality of encryption pipelines to respectively encrypt a plurality of video sub-streams partitioned from the video stream in parallel in a single pass as the video sub-streams are being generated;
wherein the plurality of encryption pipelines use a corresponding plurality of multi-part encryption counters to encrypt the corresponding video sub-streams as the video sub-streams are being generated; and
wherein each of the multi-part encryption counters used by each of the encryption pipelines comprises a sub-portion that remains constant for the encryption pipeline while the encryption pipeline encodes the corresponding video sub-stream, and wherein the sub-portions of the multi-part encryption counters of the encryption pipelines that remain constant for the respective encryption pipelines are unique, and differ from each other.

2. The apparatus of claim 1, wherein the unique sub-portions of the multi-part encryption counters used by the encryption pipelines respectively identify the encryption pipelines.

3. The apparatus of claim 1, wherein each of the multi-part encryption counters of each of the encryption pipelines comprises three sub-portions, of which the unique sub-portion of each encryption pipeline that remains constant while encoding the corresponding video sub-stream, and differs from corresponding sub-portions of the multi-part encryption counters used by the other encryption pipelines, is one of the three sub-portions.

4. The apparatus of claim 3, wherein each of the multi-part encryption counters of each of the encryption pipelines comprises a plurality of bits, and wherein a first of the three sub-portions of each multi-part encryption counter forms the most significant bits of the multi-part encryption counter, and the first sub-portion remains constant while encoding the video sub-streams, and the first sub-portion is the same for all multi-part encryption counters used by the all encryption pipelines.

5. The apparatus of claim 4, wherein the first sub-portion of each of the multi-part encryption counters of each of the encryption pipelines that is the same for all multi-part encryption counters used by the all encryption pipelines identifies a common encryption session of the encryption pipelines.

6. The apparatus of claim 5, wherein a second of the three sub-portions of each multi-part encryption counter of each of the encryption pipelines forms the next most significant bits of the multi-part encryption counter, and the second sub-portion is the unique sub-portion of each encryption pipeline that remains constant while encoding the corresponding video sub-stream, and differs from corresponding sub-portions of the multi-part encryption counters used by the other encryption pipelines.

7. The apparatus of claim 6, wherein a third of the three sub-portions of each multi-part encryption counter of each of the encryption pipelines forms the least significant bits of the multi-part encryption counter, and the third sub-portion increments as the corresponding video sub-stream is encoded by the corresponding encryption pipeline.

8. The apparatus of claim 7, wherein each third sub-portion of each multi-part encryption counter of each of the encryption pipelines starts with a value 0, and increments by 1, after n number of bytes of the corresponding video sub-stream the encryption pipeline are encoded.

9. The apparatus of claim 8, wherein each multi-part encryption counter of each of the encryption pipelines comprises 128 bits, the first sub-portion that remains at the same constant to identify the common encryption session of the encryption pipelines forms the 64 most significant bits, the second sub-portion that remains at one of the different unique constants to identify the encryption pipeline forms the next 4 most significant bits, the third sub-portion that varies forms the 60 least significant bits, and n equals 16.

10. The apparatus of claim 1, wherein the plurality of video sub-streams are encoded video sub-streams; and wherein the apparatus further comprises an encoder, having a plurality of coding engines, to receive frames of the video stream, partition each frame of the video stream into a plurality of sub-frames, encode multiple ones of the plurality of sub-frames of the frames in parallel, and output the parallel encoded sub-frames of the frames as the plurality of video sub-streams.

11. The apparatus of claim 10, further comprising a processor having a plurality of processor cores; wherein either or both of the encoders and the encryption engine are operated by the processor.

12. A method for computing, comprising:
receiving, by a plurality of encryption pipelines of an encryption engine, a plurality of video sub-streams partitioned from a video stream;
respectively encrypting, by the plurality of encryption pipelines, the plurality of video sub-streams in parallel in a single pass as the video sub-streams are being generated;
wherein encrypting comprises the plurality of encryption pipelines using a corresponding plurality of multi-part encryption counters to encrypt the corresponding video sub-streams in a single pass as the video sub-streams are being generated; and
wherein each of the multi-part encryption counters used by each of the encryption pipelines comprises a sub-portion that remains constant for the encryption pipeline while the encryption pipeline encodes the corresponding video sub-stream, and wherein the sub-portions of the multi-part encryption counters of the encryption pipelines that remain constant for the respective encryption pipelines are unique, and differ from each other.

13. The method of claim 12, wherein the unique sub-portions of the multi-part encryption counters used by the encryption pipelines respectively identify the encryption pipelines.

14. The method of claim 13, wherein each of the multi-part encryption counters of each of the encryption pipelines comprises three sub-portions, of which the unique sub-portion of each encryption pipeline that remains constant while encoding the corresponding video sub-stream, and differs from corresponding sub-portions of the multi-part encryption counters used by the other encryption pipelines, is one of the three sub-portions.

15. The method of claim 14, wherein each of the multi-part encryption counters of each of the encryption pipelines comprises a plurality of bits, and wherein a first of the three sub-portions of each multi-part encryption counter forms the most significant bits of the multi-part encryption counter, and the first sub-portion remains constant while encoding the video sub-streams, and the first sub-portion is the same for all multi-part encryption counters used by the all encryption pipelines;
wherein the first sub-portion of each of the encryption pipelines identifies a common encryption session of the encryption pipelines;
wherein a second of the three sub-portions of each multi-part encryption counter of each of the encryption pipelines forms the next most significant bits of the multi-part encryption counter, and the second sub-portion is the unique sub-portion of each encryption pipeline that remains constant while encoding the corresponding video sub-stream, and differs from corresponding sub-portions of the multi-part encryption counters used by the other encryption pipelines;
wherein a third of the three sub-portions of each multi-part encryption counter of each of the encryption pipelines forms the least significant bits of the multi-part encryption counter, and the third sub-portion increments as the corresponding video sub-stream is encoded by the corresponding encryption pipeline.

16. The method of claim 15, wherein each third sub-portion of each multi-part encryption counter of each of the encryption pipelines starts with a value 0, and increments by 1, after n number of bytes of the corresponding video sub-stream the encryption pipeline are encoded.

17. The method of claim 12, wherein the plurality of video sub-streams are encoded video sub-streams; and wherein the method further comprises receiving, by an encoder having a plurality of coding engines, frames of the video stream, partitioning each frame into a plurality of sub-frames, encoding multiple ones of the plurality of sub-frames of the frames in parallel, and outputting the parallel encoded sub-frames of the frames as the plurality of video sub-streams.

18. One or more non-transitory computer-readable media comprising instructions that cause a computer device, in response to execution of the instructions by a plurality of processor cores of a processor of the computer device, to provide an encryption engine to encrypt a video stream;
wherein the encryption engine comprises a plurality of encryption pipelines to respectively encrypt a plurality of video sub-streams partitioned from the video stream in parallel in a single pass as the video sub-streams are being generated;
wherein the plurality of encryption pipelines use a corresponding plurality of multi-part encryption counters to encrypt the corresponding video sub-streams in a single pass as the video sub-streams are being generated; and
wherein each of the multi-part encryption counters used by each of the encryption pipelines comprises a sub-portion that remains constant for the encryption pipeline while the encryption pipeline encodes the corresponding video sub-stream, and wherein the sub-portions of the multi-part encryption counters of the encryption pipelines that remain constant for the respective encryption pipelines are unique for the one encryption pipeline, and differ from each other.

19. The one or more non-transitory computer-readable media of claim 18, wherein the unique sub-portions of the multi-part encryption counters used by the encryption pipelines respectively identify the encryption pipelines.

20. The one or more non-transitory computer-readable media of claim 19, wherein each of the multi-part encryption counters of each of the encryption pipelines comprises three sub-portions, of which the unique sub-portion of each encryption pipeline that remains constant while encoding the corresponding video sub-stream, and differs from corresponding sub-portions of the multi-part encryption counters used by the other encryption pipelines, is one of the three sub-portions.

21. The one or more non-transitory computer-readable media of claim 20, wherein each of the multi-part encryption counters of each of the encryption pipelines comprises a plurality of bits, and wherein a first of the three sub-portions of each multi-part encryption counter forms the most significant bits of the multi-part encryption counter, and the first sub-portion remains constant while encoding the video sub-streams, and the first sub-portion is the same for all multi-part encryption counters used by the all encryption pipelines.

22. The one or more non-transitory computer-readable media of claim 21, wherein the first sub-portion of each of the multi-part encryption counters of each of the encryption pipelines that is the same for all multi-part encryption counters used by the all encryption pipelines identifies a common encryption session of the encryption pipelines;
wherein a second of the three sub-portions of each multi-part encryption counter of each of the encryption pipelines forms the next most significant bits of the multi-part encryption counter, and the second sub-portion is the unique sub-portion of each encryption pipeline that remains constant while encoding the corresponding video sub-stream, and differs from corresponding sub-portions of the multi-part encryption counters used by the other encryption pipelines;
wherein a third of the three sub-portions of each multi-part encryption counter of each of the encryption pipelines forms the least significant bits of the multi-part encryption counter, and the third sub-portion increments as the corresponding video sub-stream is encoded by the corresponding encryption pipeline.

23. The one or more non-transitory computer-readable media of claim 22, wherein each third sub-portion of each multi-part encryption counter of each of the encryption pipelines starts with a value 0, and increments by 1, after n number of bytes of the corresponding video sub-stream the encryption pipeline are encoded.

24. The one or more non-transitory computer-readable media of claim 22, wherein each multi-part encryption counter of each of the encryption pipelines comprises 128 bits, the first sub-portion that remains at the same constant to identify the common encryption session of the encryption pipelines forms the 64 most significant bits, the second sub-portion that remains at one of the different unique constants to identify the encryption pipeline forms the next 4 most significant bits, the third sub-portion that varies forms the 60 least significant bits, and n equals 16.

25. The one or more non-transitory computer-readable media of claim 18, wherein the plurality of video sub-streams are encoded video sub-streams; and wherein the computer device further comprises an encoder having a plurality of coding engines to receive frames of the video stream, partition each frame into sub-frames, encode multiple ones of the plurality of sub-frames of the frames in parallel, and output the parallel encoded sub-frames of the frames as the plurality of video sub-streams.

* * * * *